United States Patent [19]

Blaschke

[11] Patent Number: 4,629,961

[45] Date of Patent: Dec. 16, 1986

[54] METHOD AND APPARATUS FOR STABILIZING THE LOCUS OF A VECTOR FORMED BY INTEGRATION

[75] Inventor: Felix Blaschke, Erlangen, Fed. Rep. of Germany

[73] Assignee: Siemens Aktiengesellschaft, Berlin and Munich, Fed. Rep. of Germany

[21] Appl. No.: 733,485

[22] Filed: May 10, 1985

[30] Foreign Application Priority Data

May 18, 1984 [DE] Fed. Rep. of Germany ....... 3418573

[51] Int. Cl.$^4$ .............................................. H02P 5/40
[52] U.S. Cl. ............................... 318/803; 324/158 MG
[58] Field of Search ............... 318/800, 803, 798, 802, 318/807–811; 324/158 MG

[56] References Cited

U.S. PATENT DOCUMENTS 3,593,083 7/1971 Blaschke ............................. 318/227
4,282,473 8/1981 Dreiseitl et al. .

4,388,577 6/1983 Blaschke et al. ..................... 318/717
4,423,367 12/1983 Blaschke et al. ..................... 318/803

*Primary Examiner*—David Smith, Jr.
*Attorney, Agent, or Firm*—Kenyon & Kenyon

[57] ABSTRACT

In order to determine from a reference vector (for instance from the EMF vector $\bar{e}_s$ of a rotating field machine given by the current $i_s$ and the voltage $\underline{u}_s$) a model vector by integration (for instance the flux vector) and to thereby suppress defects of technical integrators and instabilities of the circuit used, a correction vector is formed which is rotated relative to the model vector (angle $\epsilon_\phi$) and of which the magnitude is proportional to the derivative of the vector magnitude, or proportional to another volatile quantity. The model vector itself is obtained by integration of the sum vector formed by the reference vector and correction vector. This "voltage model" can optionally be controlled by a reference vector.

17 Claims, 6 Drawing Figures

METHOD AND APPARATUS FOR STABILIZING THE LOCUS OF A VECTOR FORMED BY INTEGRATION

BACKGROUND OF THE INVENTION

The present invention relates to a method of stabilizing a model vector, which is a map of a vectorial physical quantity of a machine and is formed in a computing circuit containing at least one integrator, by integration of a sum vector formed by an input vector and a correction vector. The invention relates further to the application of this method as well as to apparatus for achieving this purpose.

The problem underlying the invention is the influence of integration errors of technical integrators for determining parameters which are required as mathematical images of physical quantities with integral relationships in the control of technical processes.

In a preferred field of application of the invention, a rotating field machine is controlled or regulated highly dynamically by the provision that its stator current is preset by a converter as a function of two flux direction related control quantities which influence the stator current component parallel to the flux and perpendicular to the flux independently. In order to change from the flux direction related control quantities to the so-called "stator-related" control quantities of the converter which are stationary in space, information on the direction of the flux vector is required and, if control of the flux is of advantage, also the absolute magnitude of the flux vector must be determined.

In German Pat. No. 18 06 769, (U.S. Pat. No. 3,593,083) a so-called "voltage model" is proposed for this purpose which, according to the relationships $$\underline{e}_s = \underline{u}_s - r^s \cdot \underline{i}_s - l^\sigma d\underline{i}_s/dt$$

$$\underline{\psi}_s = \int \underline{e}_s dt$$

calculates from the stator voltage vector $\underline{u}_s$ and the stator current vector $\underline{i}_s$ the orthogonal components (subscript s1 and s2) from corresponding measured voltage and current values as well as from parameters for the stator resistance $r^s$ and the leakage inductance $l^\sigma$, the EMF vector $\underline{e}$ and by means of integrators for integration by components, the corresponding flux vector $\underline{\psi}_s$ in the orthogonal stator-related coordinates. Since, however, integrators exhibit null-drift and other integration errors, the model vector $\underline{\psi}_s$ calculated in this computing circuit as the model flux is different from the mathematical integral of the input vector $\underline{e}_s$. The determined flux vector $\underline{\psi}_s$ is therefore only an imperfect image (map) of the actual flux.

In FIG. 1 the model vector $\underline{\psi}_s$ is shown in relation to the Cartesian coordinate axes S1 and S2 fixed in space. In this coordinate presentation it has the components $\psi_{s1}$ and $\psi_{s2}$ shown in FIG. 1 which, according to $\psi_{sz} = \psi \cos \phi_s$ and $\psi_{s2} = \psi \sin \phi_s$ are mathematically equivalent to the polar amplitude coordinate $\psi$ (model vector magnitude) and to the polar angle coordinate $\phi_s$ (direction of the model vector in the S1, S2 system.

For the processing of the angle coordinate, a presentation by a pair of trigonometric functions (cos $\phi_s$, sin $\phi_s$) is frequently of advantage which describes the Cartesian components of a unit vector $\underline{\phi}_s$ given by the angle $\phi_s$. So-called "vector analyzers" furnish the magnitude and the pair of trigonometric functions from the vector components. Rotation of the vector $\underline{\psi}$ by an angle $\epsilon$ corresponds to a rotation of the coordinate system and can be carried out by an angle addition in a so-called "vector rotator" to which the angle of rotation is fed as a corresponding unit vector $\underline{\epsilon} = (\cos \epsilon, \sin \epsilon)$. The angle coordinate of the vector in the rotated coordinate system corresponds to a new unit vector $(\underline{\phi}_s + \underline{\epsilon})$ from which follow by component-wise multiplication of the unchanged magnitude $\psi$, the corresponding Cartesian vector components in the rotated system, or the components of the rotated vector in the original system.

FIG. 1 now shows the case that, in the coordinate system fixed in space, the vectorial physical quantity $\underline{\psi}_s$ while it revolves uniformly and therefore would have to be imaged mathematically by the components $\psi \cdot \cos wt$ and $\psi \cdot \sin wt$ (this corresponds to a concentric circle about the coordinate origin Oo), the drift of technical integrators leads to the condition that the locus of the model vector $\underline{\psi}_s$ furnished by the integrators takes an eccentric course. As "eccentricity" or "d-c component vector" of the locus is designated here the vector $\underline{\Delta}$ leading from Oo to the center O of the locus. The latter has the stator-oriented Cartesian coordinates $\Delta_{s1}$ and $\Delta_{s2}$. The Cartesian components $\psi_{s1}$ and $\psi_{s2}$ of the model vector are therefore obtained as $\psi_{s1} = \Delta_{s1} + \psi \cos wt$, $\psi_{s2} = \Delta_{s2} + \psi \sin wt$ with the d-c components $\Delta_{s1}$ and $\Delta_{s2}$.

In order to suppress the d-c components, it is provided in the mentioned German Pat. No. 18 06 769 to bring the model vector $\underline{\psi}_s$ of the flux via a null regulator which forms a correction vector therefrom. The vectorial sum (sum vector) of the negative correction vector and the predetermined vector $\underline{e}_s$ of the EMF is then subjected to the integration for forming the vector $\underline{\psi}_s$ itself.

The control loop formed thereby thus controls the d-c components in the integrator output to zero but causes an angle error which leads dynamically and statically to a misadjustment of the model vector and becomes larger and larger at lower frequencies. Therefore, this d-c component control can intervene only relatively weakly and cannot level out larger errors. Therefore, a so-called "adaptive voltage model" is proposed in German Offenlegungsschrift No. 28 33 542 (U.S. Pat. No. 4,282,473), in which the feedback loop is conducted via a P-controller and an I-controller, the action of which is weighted as a function of frequency. Thereby a frequency-independent angle error is obtained which can be taken into consideration in the design of the controller as long as it can be kept relatively small. However, angle errors of up to 40° are required for sufficient stability of the locus, and their compensation in the controller leads to difficulties.

It is therefore provided in German Offenlegungsschrift No. 30 26 202 (U.S. Pat. No. 4,388,577) not to level the model vector to zero in the feedback loop, but to a reference value which is obtained in other ways. Other possibilities for calculating the flux from suitable actual values are available. In particular, a computing circuit known as a "current model" can be used which calculates from the stator current the rotor position (or also the rotor frequency), as well, in the case of synchronous machines, from the field current, calculates the flux generated in the machine by the current by simulating the dynamic processes of the machine.

This current model is of advantage particularly if, at low speeds, the EMF has only small amplitudes and therefore, the calculation of the flux in the voltage model is subjected to computing errors. In this known arrangement, however, the model vector calculated by the current model is used as the reference value for the null regulator in the feedback loop of the voltage model and the action of the null regulators is frequency-dependent to such a degree that this null regulation is effective practically only at low frequencies. It follows from this that at low frequencies, the voltage model is controlled by the current model. Then, the current model largely determines the model vector of the voltage model, and the influence of the voltage model is preponderant only at higher frequencies. While this procedure makes possible the determination of the flux vector in a large frequency region without the need to switch between the current model and the voltage model, the result of the voltage model depends on the quality of the current model. In addition, it presupposes the existence of the current model. The same applies also if the voltage model were controlled by the reference voltage preset for the control of the flux. In this connection, it has also been proposed already to recalculate the model vector furnished by the voltage model as well as the vector furnished by the current model as the reference value into polar coordinates in order to determine the correction vector formed by appropriate controls in polar coordinates and to impress it on the input vector $\underline{e}_s$.

SUMMARY OF THE INVENTION

It is, therefore, an object of the present invention to suppress in a voltage model of this type (or more generally, in a computing circuit containing integrators for forming a model vector) by integration of an input vector (said input vector corresponding to a physical quantity and being formed through measured values) in a manner substantially free of errors, the integrator drift and to stabilize the locus of the model vector, which is a map of a vectorial physical quantity of a machine.

These and other objects of the present invention are achieved by a method for stabilizing the locus of the model vector in a computing circuit containing at least one integrator (5). While the measured values define an input vector, a sum vector formed by the input vector, and a correction vector is integrated and defines the model vector imaging the interesting vectorial physical quantity. The correction vector is given by presetting a predetermined angle to the correction vector with respect to the model vector and a magnitude which is derived from a volatile quantity of the model vector, said volatile quantity mapping another the physical quantity becoming zero in the steady state of the machine and its vectorial physical quantity.

BRIEF DESCRIPTION OF THE DRAWINGS

The invention will be described in greater detail in the following detailed description with reference to the drawings in which.

DETAILED DESCRIPTION

With reference not to the drawings, in the stabilizing methods known from the state of the art, the integration is based on the vector sum of the input vector and a correction vector, wherein the correction vector is derived directly from the model vector formed by the integrators themselves, i.e., from the control deviation from a reference vector furnished by the current model. The magnitude and direction of the correction vector are derived in this state of art, from the magnitude and the direction of the model vector, i.e., from quantities which are present not only in the case of dynamic changes but also in the stationary state.

The invention starts out with the assumption that the correction vector can advantageously be formed in such a way that it appears only in the case of dynamic changes of the vectorial physical quantity or the model vector imaging the vectorial physical quantity, but becomes zero for stationary states, i.e., becomes zero for uniform rotation of the model vector on a centered locus curve. For, if another physical quantity is derived from the vectorial physical quantity in such a manner that it becomes zero in the stationary state, also the "volatile" quantity which is, as a map of the other quantity, derived from the mathematical image of this vectorial physical quantity (i.e., from the model vector) must disappear in the stationary state; if it does not become zero in the stationary state of the vectorial physical quantity, the null deviation is a measure of the imperfection of the imaging by the model vector.

Therefore, the correction vector magnitude is preset, according to the invention, to such a "volatile" quantity of the model vector. The direction, on the other hand, is advantageously chosen so, for instance, that the correction vector always is oriented antiparallel to the d-c component vector, or at least after integration over one revolution of the model vector on the locus. After averaging over a period, the correction vector therefore counteracts the eccentricity of the locus the more, the stronger the volatile quantity (i.e., the imaging errors due to the use of technical integrators). In the case considered, it therefore levels out the d-c components $\Delta_{s1}$ and $\Delta_{s2}$ in the model vector components $\psi_{s1}$ and $\psi_{s2}$ without being able to exert, in the stationary state a falsifying influence on the phase of the magnitude of the model vector.

The direction can be set generally by means of predetermined functions of suitable input quantities in order to fix, optionally taking state variables of the vettorial physical quantity into consideration, the angle between the correction vector and the model vector (and advantageously also the proportionality between the magnitude of the correction vector and the volatile quantity).

Figure 2:
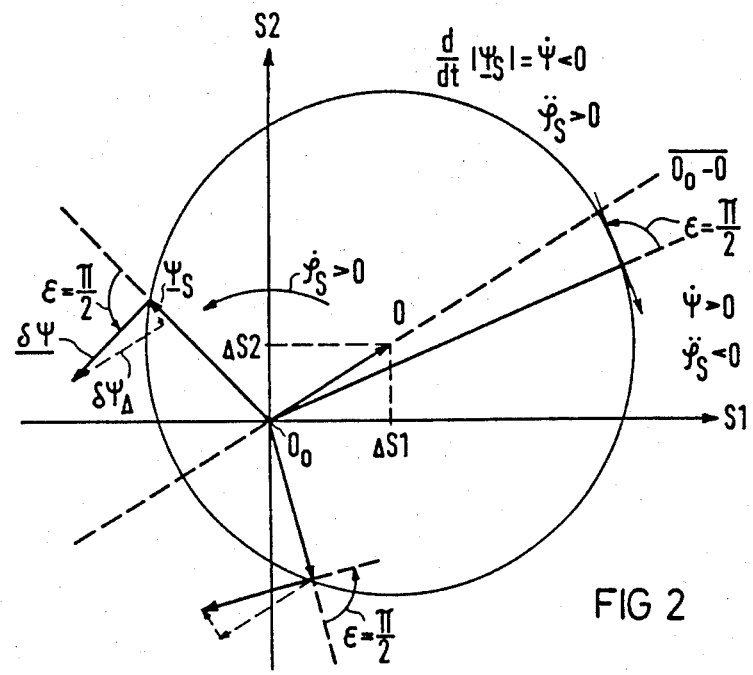
FIG. 2 shows a locus of the model vector for a positive direction of rotation.

As a volatile quantity can be considered, for instance, the angular acceleration $\ddot{\phi}_s$ of the model vector $\underline{\psi}_s$ which, in the case shown in FIG. 2 with positive rotation ($\dot{\phi}_s = d\phi_s/dt > 0$) is positive in the half-plane lying to the left above the dashed line $\overline{Oo\text{-}O}$, but negative in the other half plane. Another similarly "volatile" magnitude is, in particular, the derivative of the amount of the model vector ($-\dot{\psi} = -d\psi/dt$) which is negative in the left upper-half plane for positive direction of rotation and positive in the other half plane.

In the simplest case, the direction of the correction vector $\delta\underline{\psi}$ is given by the provision that the unit vector $\phi_s$ corresponding to the directional angle $\phi_s$ of the model vector is rotated by $\epsilon = \pi/2$. FIG. 2 shows that in the left upper-half plane, where $\psi < 0$ applies, the correction vector $\delta\psi$ with $$\delta\psi_{s1} = |\dot\psi| \cos(\phi_s + \pi/2)$$

$$\delta\psi_{s2} = |\dot\psi| \sin(\phi_s + \pi/2)$$

is then obtained from the volatile magnitude $-\dot\psi = |\dot\psi|$ in rotor oriented coordinates, the projection on $\underline{\Delta}$ being negative ($\delta\psi_\Delta < \sigma$). In the other half-planes, the stator-oriented correction vector $$\delta\psi_{s1} = -\dot\psi \cos(\phi_s + \pi/2)$$

$$\delta\psi_{s2} = -\dot\psi \sin(\phi_s + \pi/2)$$

is obtained, because of $\dot\psi > 0$, the projection on $\underline{\Delta}$ of which is likewise negative as is shown in FIG. 2 for different angle positions of the stator-oriented model vector $\underline{\psi}_s$. Here, the component $\delta\psi_\Delta$ parallel to $\underline{\Delta}$ then becomes zero if the magnitude of the correction vector and therefore also the component perpendicular to the model vector becomes zero ($\delta\psi = 0$). This, however, is the case only if $\psi_s$ falls on the straight line $\overline{Oo\text{-}O}$ and also the quantity $-\dot\psi$ determining this magnitude changes its sign. Therefore, the component $\delta\psi_\Delta$ parallel to $\underline{\Delta}$ is always negative for $\epsilon = \pi/2$ or at least zero. The component orthogonal to $\underline{\Delta}$, on the other hand, changes its sign in FIG. 2 if $\psi_s$ goes through the straight line $\overline{Oo\text{-}O}$; it is averaged away in one revolution and therefore remains without influence as long as $\psi_s$ rotates ($\dot\phi_s 0$). The state $\dot\phi_s = 0$ (flux at rest) is a singular state here which can be avoided if the correction vector is made ineffective if the flux is at rest (for instance, if the machine is standing still).

Figure 3:
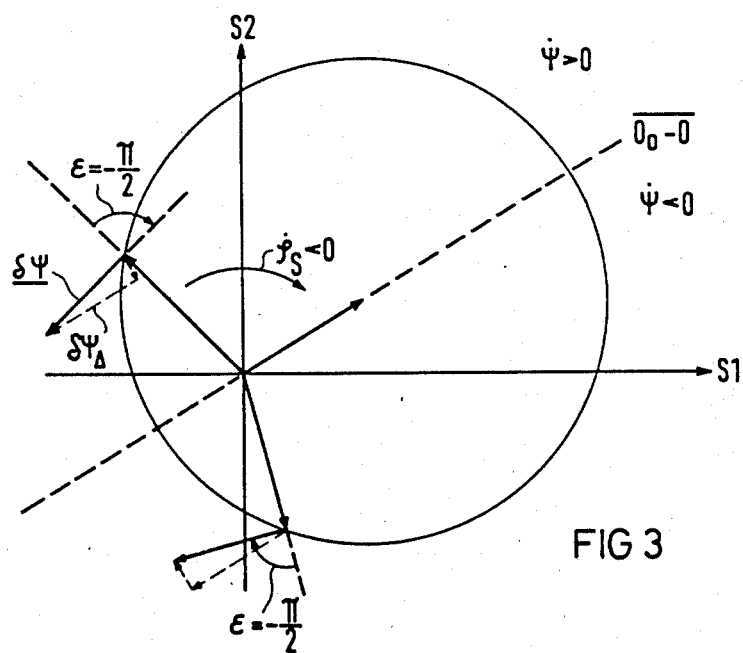
FIG. 3, shows the locus for a negative direction of rotation.

FIG. 3 shows the formation of the correction vector for negative direction of rotation ($\dot\phi_s < 0$) of the model vector. The amount of correction is either proportional here to $\dot\psi$, while maintaining the angle $\epsilon = \pi/2$ or is further preset proportional to $-\dot\psi$ while changing to $\epsilon = -\pi/2$. For the correction vector are therefore obtained the same conditions as in FIG. 2, and in particular, the angle between $\psi$ and $\delta\psi$ in the left upper half plane is given by $+\pi/2$ (corresponding to the positive sign of $-\dot\phi_s\dot\psi$), and in the other half plane (corresponding to the negative sign of $-\dot\phi_s\dot\psi$), by $-\pi/2$, $\delta\psi_\Delta$ remaining negative as before.

The addition of the input vector designated with $e_s$ and the correction vector $\delta\psi$ to the sum vector represents for the model vector $\underline{\psi}_s$, which is formed by integration of the sum vector, practically a control loop by which the d-c component in the locus curve is leveled out, wherein, however, no stationary error and, in particular, no phase error is generated and also no control by a current model is required. The control is rather exerted automatically to the reference value zero of the volatile quantity belonging to the stable locus curve.

This control corresponds to damping in the calculation of the flux and therefore yields useful results also with non-stationary motions of the flux. In order to keep the influence of the damping small for motions of the vectorial physical quantity, it may be advisable, however, to set for this control a reference value for the volatile quantity (for instance, the change of the flux reference value which is given by the control, or the derivative of the flux calculated in a current model). The magnitude of the correction vector is then not determined by the volatile quantity $-\dot\psi$ alone, but by the difference $-(\dot\psi - \dot\psi^*)$ between the volatile quantity and the reference quantity $\dot\psi^*$.

Since in addition, the model vector is perpendicular to the input vector in the stationary condition, also the component of the input vector perpendicular to the model vector can be used as the volatile quantity in good approximation and with an almost equally good result.

Figure 4:
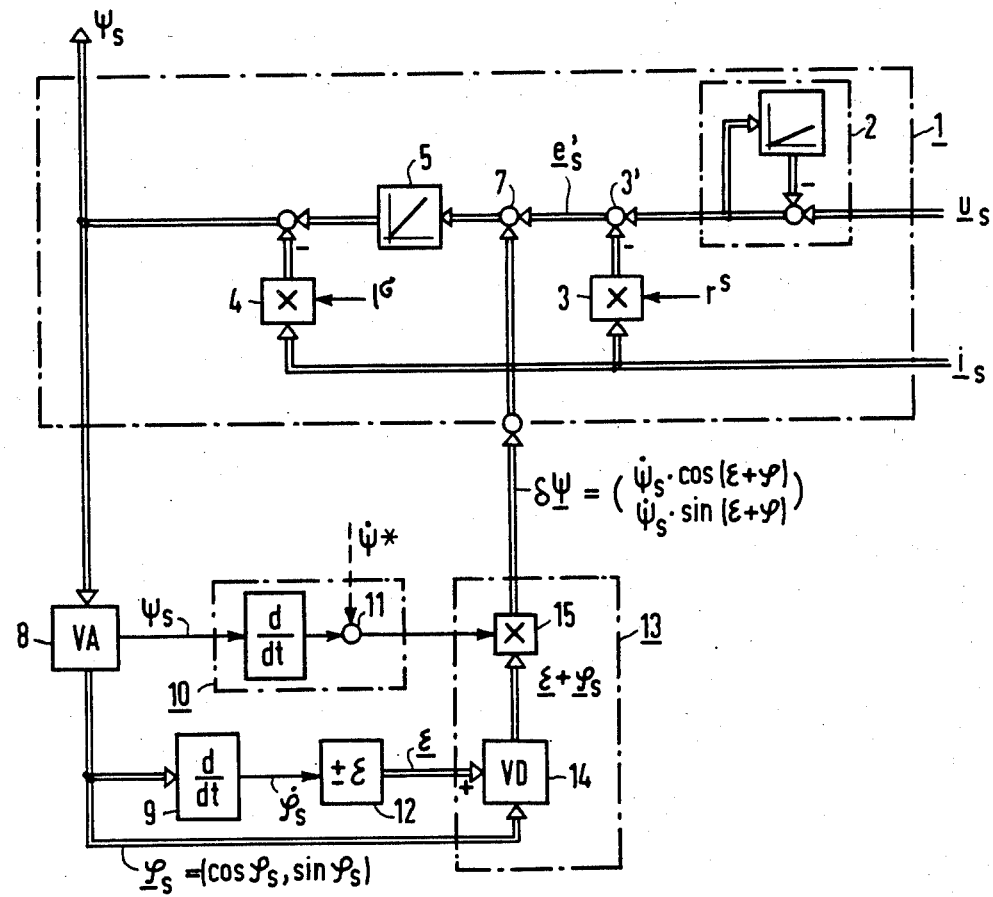
FIG. 4 shows apparatus for carrying out the method with a computing mechanism operating in stator coordinates.

A suitable apparatus for carrying out the method according to the invention is shown in FIG. 4, where lines serving for transmitting vector signals are shown as double arrows (corresponding to an individual line each for one of the two components of a vector). Components such as multipliers, adders and controllers contain, as far as they have a vector input, always a single component for each of the two vector components, but are shown in as single symbol.

In the apparatus according to FIG. 4, the computing circuit 1 contains inputs for the stator voltage vector $u_s$ and the stator current vector $i_s$ shown in stator coordinates, where a weak d-c component control 2 can already be provided for the stator voltage vector. The d-c component of $u_s$ is formed here by means of an integrator with a long time constant and is substracted from $u_s$. This d-c component separation generates the a-c voltage component $\underline{u}_s$ practically without any angle error; but is acting only very slowly.

The computing circuit 1 contains means for forming the EMF vector $\underline{e}_s = \underline{u}_s - r^s \cdot \underline{i}_s - l^\sigma \underline{di}_s/dt$, where the parameter $r^s$ of the stator resistance and the parameter $l^\sigma$ of the leakage conductance are respectively set at multipliers 3 and 4. In order now to arrive at the model vector $\underline{\psi}_s$ for the flux by component-wise integration of the input vector by means of integrators 5 it is provided to add negatively to the a-c voltage component of the voltage vector, the vector $r^s i_s$ prior to integration, and the vector $l^{94} \cdot i_s$ behind the integrators. The sum vector to be integrated is therefore formed in the present case by the correction vector $\delta\psi$ present at the input 6 and an input vector $\underline{e}'_s = \underline{e}_s + l^\sigma \underline{di}_s/dt$ at the adding stage 7.

The computing circuit 1 is followed by a vector analyzer 8, the purpose of which is to form from the vector signal $\underline{\psi}_s$ for the model vector formed by the computing stage, the model magnitude $\psi$ and the angle signal $\phi_s$. This angle signal can particularly be read out as a pair of trigonometric functions $\cos\phi_s$, $\sin\phi_s$, i.e., as the corresponding unit vector $\underline{\phi}_s$.

A first differentiation stage 9 forms the angular velocity $\dot\phi_s$ from the angle signal. If the vector signal $\underline{\phi}_s$ is used, such a differentiation stage can be realized, for instance, according to German Offenlegungsschrift No. 31 39 136.

A second differentiation stage 10 forms the derivative $\dot\psi$ of the model magnitude. This differentiation stage can contain a subtraction point 1 so that in this case, the difference of the differentiated model vector magnitude determined from the magnitude of the model flux and a corresponding input quantity $\dot\psi^*$ is formed.

The quantity formed by the differentiation stage 10, together with the angle of rotation $\epsilon$ furnished by an angle-of-rotation former 12, is fed to a vector former 13. Advantageously, also the angle-of-rotation former forms as the angle of rotation the components $\cos\epsilon$, $\sin\epsilon$ of the corresponding unit vector $\underline{\epsilon}$.

The vector former 13 now yields the correction vector $\delta\psi$, which therefore has the magnitude $|\delta\psi| = (\dot\psi^* - \dot\psi)$ and the angle $\delta = \epsilon + \phi_s$, which is determined, for instance, by angle addition in a vector rotator 14. The magnitude can be taken care of in a magnitude former 15 by component-wise multiplication of one of the unit vectors $\underline{\epsilon}$ and $\underline{\phi}_s$. Because the vector rotator 14 is used, the correction vector is read out in the stator oriented components which are required at the adding stage 7.

The integration of the sum vector $\underline{e}'_s + \delta\underline\psi$ takes place in the circuit according to FIG. 4 by integration of the stator oriented components by means of the integrators 5. However, the input vector can also be transformed into a rotating coordinate system and the correction vector can be formed already in the rotating coordinate system.

Figure 5:
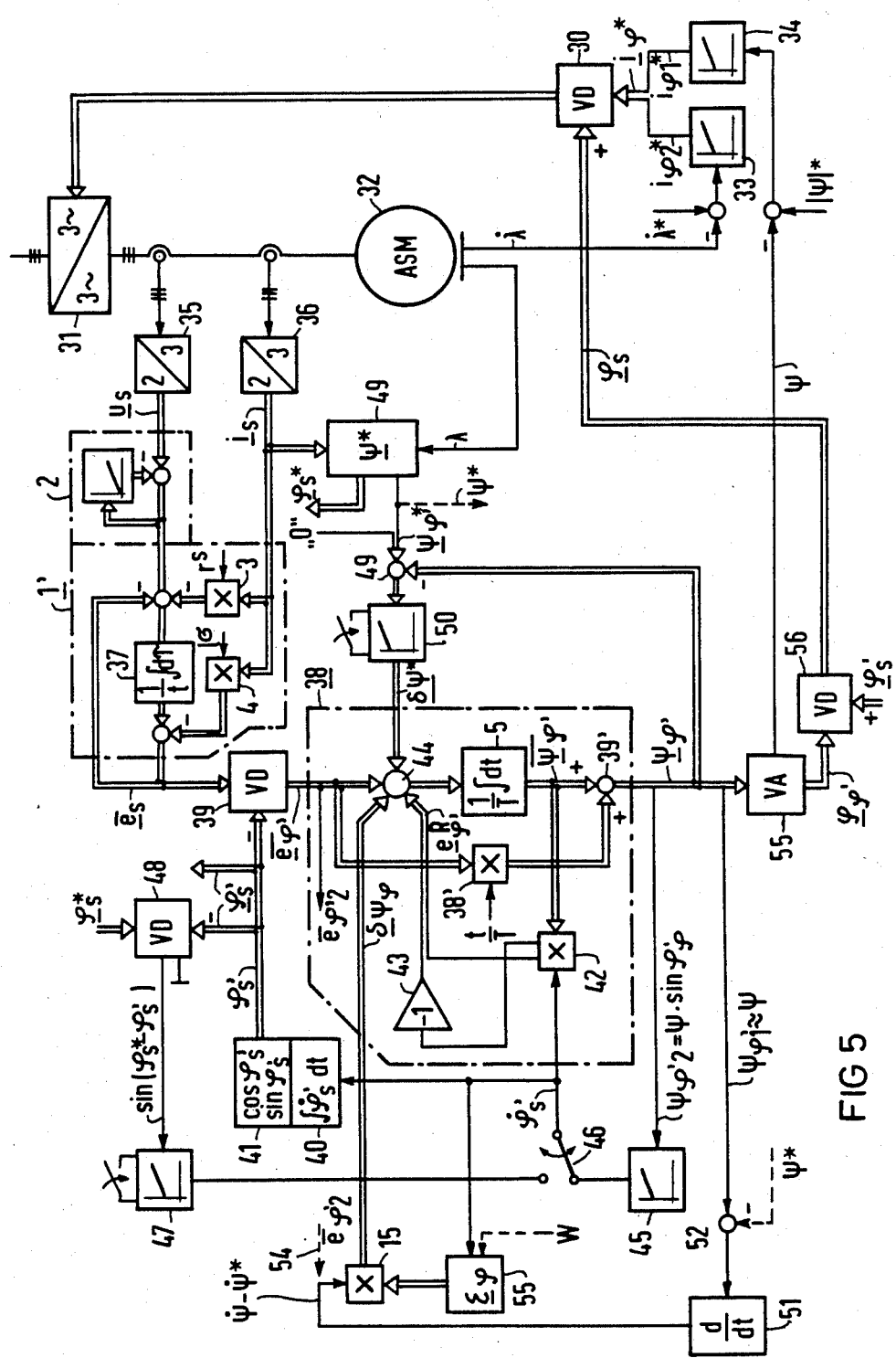
FIG. 5 shows the application of apparatus including a computing mechanism using flux-oriented coordinates.

This is shown in FIG. 5, wherein the rotating coordinate system is defined by the provision that the angle of a coordinate axis of the coordinate system designated with $\underline\phi'_s$ is slaved to the angle $\phi_s$ between the model vector and the stator oriented S1 axis. This "field oriented" coordinate system is rotated relative to the stator oriented system by the angle $\phi_s'$. In such a coordinate system (characterized by the subscript $_{\phi'}$), it must, however, be taken into consideration that the integral physical relationship between the input vector and the model vector reads, taking into consideration a rotary component:

$$\underline\psi_{100}' = \int (\underline{e}_{\phi'} + \underline{e}_{\phi'}{}^R) dt$$

with $$e_{\phi1}{}^R = \dot\phi_{s'}\cdot\psi_{\phi2'}, \quad e_{\phi2'}{}^R = -\dot\phi_{s'}\cdot\psi_{100\ 1'}$$

In the balanced condition ($\underline\phi_{s'}$ $\phi_s$ and frequency of rotation $\dot\phi_{s'}$ flux frequency $\dot\phi_s$) there applies for the component of the model vector in this coordinate system:

$$\psi_{\phi2'} = |\underline\psi_{\phi'}|\cdot \sin(\phi_s - \phi_s') \to 0,$$

$$\psi_{\phi1'} = |\underline\psi_{\phi'}|\cdot \cos(\phi_s - \phi_s') \to \psi = |\underline\psi_{\phi1}|,$$

i.e., $$\underline\phi_{\phi'} = \phi_s - \phi'_s \to 0, \psi_{\phi1'} \to |\underline\psi_{\phi'}| = \psi, \underline\psi_{\phi'} \to \psi\cdot\phi_s = \underline\psi_s.$$

In FIG. 5 it is further shown how the method described so far and the corresponding apparatus interact with the control of the rotating field machine:

In the control, a field oriented current reference vector $i^*_\phi$ is formed which is transformed by a vector rotator 30 by rotation by an angle $\phi_s$ into the stator-oriented coordinate system and thereby furnishes a stator oriented reference vector $i^*_s$, which controls the converter (for instance, by a stator current controller and a control unit, not shown) in such a manner that the stator of a rotating field machine (for instance the asynchronous machine 32) is fed by a corresponding actual current $i_s$. The component $i_{\phi2^*}$ perpendicular to the field determines here as the input variable for the component of the stator current (active current) perpendicular to the field the torque of the machine and can be preset by a superimposed controller, for instance, the speed controller 33. The component $i_{\phi1^*}$ parallel to the field, on the otherhand, is a control variable for the current component (magnetizing current) parallel to the field and influences the magnitude of the machine flux; it can therefore be preset, for instance, by a flux controller 34 for the reference magnitude $|\underline\psi^*|$ of the flux. This pinciple (presetting decoupled input variables for the flux and the torque is field oriented components of a control vector and conversion into stator oriented control variables of the current by means of the flux angle $\phi_s$) can also be realized in various other ways.

At the stator current terminals of the machine 32, the vectors $u_s$ and $i_s$ are taken off via 3/2 converters 35, 36, a slow d-c component filtering (2) being again provided for the voltage vector $u_s$.

The EMF detector 1' is designed in this case in accordance with FIGS. 12 and 13 of the German Offenlegungsschrift No. 30 34 275 (U.S. Pat. No. 4,423,367) and furnishes a vector $\underline{e}_s$ which is formed by the measured values of the current and voltage and is associated with the smoothed EMF $e_s$ of the machine with a smoothing time constant t. This purpose is served by the integrator 37 (integration constant t).

In the integration circuit 38, the influence of this smoothing can be cancelled again by the provision that, from the integrated sum vector and the vector multiplied by the smoothing time constant (multiplier 38') of the smoothed EMF, the model vector is formed by addition, associated with the unsmoothed flux (adding stage 39').

From the input vector (in this case, the vector $\bar{e}_s$ of the smoothed EMF in the stator oriented coordinate system) the input vector $\bar{e}_{\phi'}$ transformed into the field oriented coordinate system is formed by means of the vector rotator 39 acted upon by the signal $\phi'_s$. The signal is formed by an integrator 40 acted upon by $\dot\phi_s'$ (i.e. practically by the flux frequency) which is here followed by a function generator 41 for forming the Cartesian components $\phi'_{s1} = \cos\phi'_s \cdot \phi'_{s2} = \sin\phi'_s$ since the angle $\phi'_s$ is to be processed as a unit vector $\underline\phi'_s$.

The rotary component $\bar{e}_{\phi'}{}^R$ can be taken into consideration in the integration by means of the integrators 5 by the provision that at the integrators 5 the output signals representing the field oriented Cartesian components of the integrated EMF vector are multiplied by the field frequency $\dot\phi_s$ or $\dot\phi'_s$ (multiplier 42) and subsequently, interchanging their relationship to the stator oriented components of the transformed EMF as well as with a reversal of the sign (inverter 43), the supplemental vector $\bar{e}_{\phi'^*}$ is formed which is impressed on the adding stage preceding the integrators 5.

The field orientation of the coordinate system used for the coordinate transformation in the vector rotator 39 can be enforced by feeding the component $\psi_{\phi2'}$ of the model vector $\psi_{\phi'}$ to a null regulator 45 which changes the frequency $\dot\phi_s$ until the ("field perpendicular") component $\psi_{\phi2'}$ becomes zero, i.e., the model vector falls in the direction of the coordinate axis $\phi'_s$.

By switching a double-throw switch 46, the frequency of rotation of the coordinate system, however, can also be formed by a servo control 47, to which the angle difference between $\phi'_s$ and a corresponding angle reference quantity $\phi_s^*$ is impressed (if the corresponding vectors $\underline\phi'_s$, $\underline\phi_s^*$ are used, this angle difference is equivalent to a component of a vector rotator 48 acted upon by these vectors. The reference quantity $\phi_s^*$ can be taken here at a current model 49 fed, for instance, by $i_s$ and the rotor angle $\lambda$ or another device provided for the control of the rotating field machine for setting a reference vector $\psi^*$ for the calculated flux. The angle control 47 then insures that the coordinate system which is the basis of the integration is given quasi-stationary by the direction reference quantity $\phi_{\epsilon^*}$ but that the voltage model still picks up dynamic changes of the flux correctly (temporary deviations of $\phi_s$ and $\phi_s^*$). So that in the quasi-stationary state, the model vector is actually field oriented in accordance with the control of the coordinate system, it is additionally provided to impress the model flux vector at a comparator 49 on the input vector (the latter has only the component $\psi_{\phi 1'}^* = \psi^*$ in the controlled coordinate system) on a magnitude servo control 50 which forms from the vectorial difference a supplemental vector which is likewise impressed to the adding point 44.

Since this control is not necessary in the position of the switch 46 shown in FIG. 5, the servo controls 47 and 50 can be made inactive by closing their shorting switches.

Since the reference vector $\psi^*$ determines the steady state value of the model vector $\psi_s$, then, if only steady state values of the flux vector are needed (for instance, for the damping according to the invention) the angle $\phi_s$ is always approximately equal to the angle $\phi'_s$ determined by the servo system, and the magnitude is approximately set equal to the angle $\phi'_s$ determined by the servo system, and the magnitude $\psi$ is set approximately to the component $\psi'_{\phi 1}$ parallel to $\phi'_s$, of the $\phi'_s$ oriented coordinate system calculated as a vector $\psi\phi^T$ ($\psi_{\phi 2} \approx \sigma$). For the dynamically correct flux determination such as is required, for instance, in the control by the vector rotator 30, the exact flux angle $\phi_s$ must be formed, however, by an angle addition $\phi_s = \phi'_s + \phi_{\phi'}$ so that the angle between the slaved coordinate axis $\phi'_s$ and the flux direction oriented to $\phi_s$ can be taken into consideration. In FIG. 5, a vector analyzer 55 forms the magnitude $\psi$ of the model vector and the direction $\phi_{\phi'}$, and the angle addition is performed by a vector rotator 56.

The stabilization of the locus according to the invention takes place also in accordance with FIG. 5 by the provision that at the addition point 44 at the input of the integrators 5, a correction vector $\delta\psi_\phi$ is set which is now to be given by field oriented components and is taken off at the magnitude former 15. The angle of rotation former 12 shown in FIG. 4 is by itself not required in the variant discussed up to now because if the angle $\epsilon = \pm\pi/2$ is preset, the field oriented direction vector $\delta\psi_\phi$ is simply given by its two components $\delta\psi_{\phi'} = \psi\cos\epsilon = 0$ and $\delta\psi_{\phi 2} = \pm\psi\sin\epsilon = \pm\dot\psi$ and can be taken off directly via a differentiatior 51 (or by means of a subtraction point 52 for forming $\psi - \psi^*$) at the output for the flux component parallel to the field. In addition it has been found that almost the same result is obtained if instead of the derivative $\dot\psi$ of the model magnitude $\psi$, the component $\bar{e}_{\phi 1}$ is used, as is shown by the dashed line 54.

Figure 1:
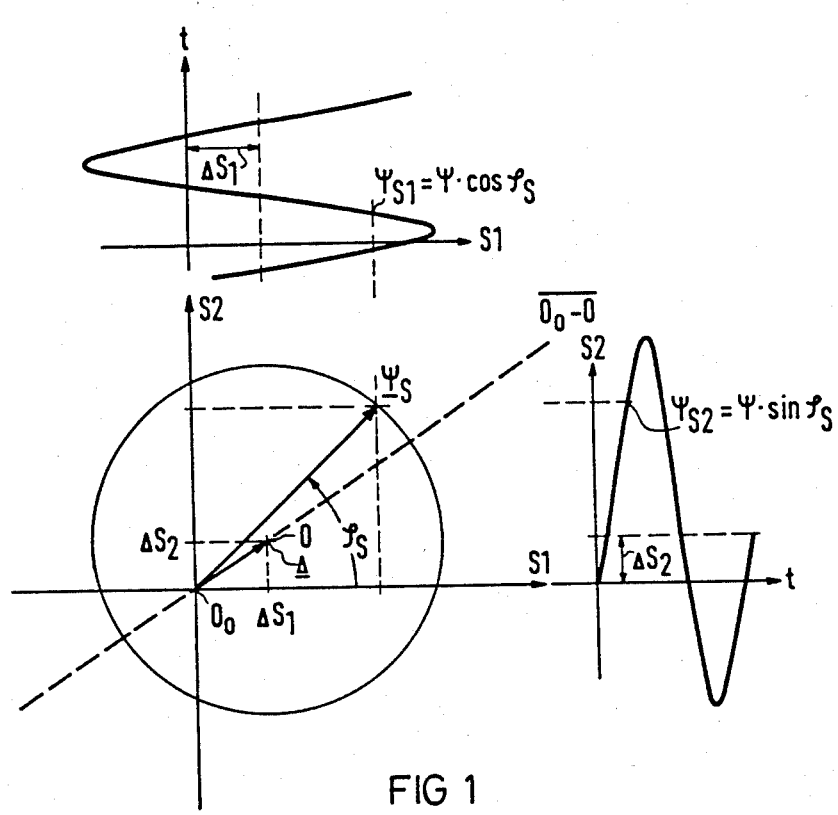
FIG. 1 shows the model vector in Cartesian coordinates.
Figure 6:
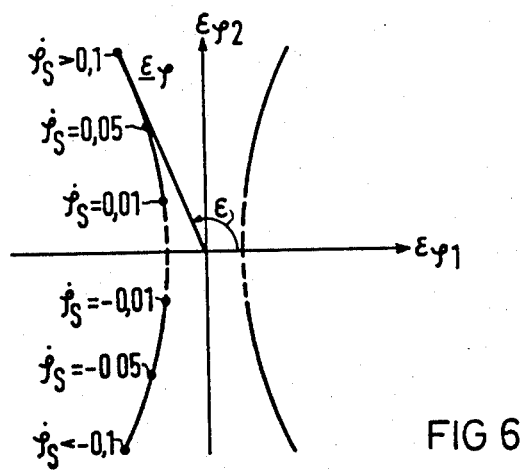
FIG. 6 shows the locus curve for the input of a control vector for the correction vector.

For the damping according to the invention, however, it is as a rule advantageous not to preset as the angle of rotation, simply the angle $\pi/2$, but to vary this angle as a function for the frequency $\dot\phi_s$. In FIG. 6, this field oriented locus of the control vector $\epsilon_\phi$ is shown, from which the correction vector $\delta\psi_\phi$ is formed by component-wise multiplication by the volatile variable, here, one of the quantities $-\dot\psi$, $\psi^*$, $-\psi^*_1 - e_{\phi 2}$ or $\psi - e_{\phi 2}$. Optionally, $e_{\phi 2}$ can be replaced equally well by $e_{\phi 2}$, $e_{\phi 2'}$ or $\bar{e}_{\phi 2'}$.

It can be seen from this locus that the control vector $\epsilon_\phi$ assumes for frequencies above 0.1 the direction $\pm\pi/2$ (i.e., $|\epsilon_{\phi 2}| > |\epsilon_{\phi 1'}|$) and approaches 180° only for $\dot\phi_s \to 0$. $\epsilon_{\phi 2} = 0$ corresponds here to the singular state $\dot\phi_s = 0$ which is precluded in the apparatus by the provision that the corresponding correction vector $\delta\phi_\phi$ is disengaged at frequencies near standstill. The locus shown in FIG. 6 assures in addition, that, upon reversal of the direction of rotation, the direction relationships of the correction vector shown in FIGS. 2 and 3 are preserved. Depending on the motor or generator operation, $\epsilon_\phi$ can lie here in any of the four quadrants.

The control vector $\epsilon_\phi$ set in according to FIG. 6 can be taken off, in the apparatus according to FIG. 5, simply at a function memory 55 which is addressed by the signal present at the input of the integrator 40. For the control of a rotating field machine it can be advantageous to use this control vector not only for damping the computing circuit but, via its engagement with the machine control, also for damping non-stationary machine states. For this purpose it may be advantageous to take off at the machine a suitable operating state variable W (for instance, the angle between voltage and current) and to address the function memory with this preset state variable W provided that, in the function memory 55, the control vector $\epsilon_\phi$ is stored also as a function of this state variable W. It is here particularly advantageous that with the magnitude $|\epsilon_\phi|$, also the proportionality factor between the correction vector magnitude and the volatile variable can be varied functionally in dependence on the operating state.

Finally, the apparatus according to FIG. 5 can be simplified by integrating only the component $e_{\phi 1}$ instead of a component-wise integration of $e_\phi$ (or $\bar{e}_\phi$). The feedback line conducted via the elements 42 and 43 is replaced by a divider for forming the quotient $e_{\phi 2}/\psi$ where this quotient can be used instead of the output signal of the controller 45. Thereby, particularly the controller 45 is eliminated so that an arrangement is thereby brought about, in which only d-c quantities have still to be processed for the integration and stabilization according to the invention, which is advantageous particularly for application in a microprocessor.

The flux determination stabilized according to the invention can be used in a rotating field machine in various ways. Thus, the flux can be used only for control and adjustment purposes instead of for intervention in the control. If the control also needs the parameter of the rotor resistance, for instance, which changes in operation, the flux can also be computed in a manner independent of the rotor resistance parameter. The difference between this calculated flux and the model vector can then be used to adjust, during the operation, the identity of the two fluxes during operations by changing this parameter and to thereby determine any change of the flux automatically.

It may also be provided, particularly at low frequencies, to take off the flux data required in the control at another device, for instance, at a current model and to let the device according to the invention run parallel without intervention into the machine control in "standby operation" and to switch from the current model to this damped voltage model only at higher frequencies. The double throw switch shown in FIG. 5 and the use of the reference quantities $\psi^*$ and $\dot\psi^*$ also provide the possibility to control the voltage model first in the steady state by other quantities where, however, dynamic flux changes are picked up by the voltage model and can be processed in the machine control. A change into the uncontrolled state can be made here, for instance, discontinuously when a given speed limit is reached; however, pulsed operation may also be provided where switching takes place alternatingly between the controlled and the uncontrolled state, and where, for instance, the duty cycle of the switching can be given changeably with the speed in order to achieve a soft transition between the controlled and the uncontrolled state.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A method for stabilizing the locus of a model vector mapping, as a metering or controlling quantity of a machine, a vectorial physical quantity of said machine,
wherein measured values of the machine defining an input vector and correction signals defined by a correction vector are fed into an integration circuit for vectorial integration containing at least one integrator and the integral of a sum vector defined by the input vector and the correction vector is formed at the output of the integration circuit and fed, as said model vector, to a control circuit of the machine,
the method comprising presetting a determined angle of the correction vector with respect to the model vector and a magnitude of the correction vector which is derived from a volatile quantity of the model vector, said volatile quantity mapping a physical quantity becoming zero in the steady state of the vectorial physical quantity.

2. The method recited in claim 1, wherein the correction vector, after averaging over one revolution, is parallel to the d-c component of the model vector on the locus.

3. The method recited in claim 1, wherein the direction of the correction vector is preset in such a way that its component perpendicular to the model vector becomes substantially zero if the magnitude of the correction vector becomes substantially zero.

4. The method recited in claim 1, wherein the direction of the correction vector is determined relative to the model vector by rotation about a predetermined positive or negative angle of rotation, where the sign of the angle of rotation is variable with the sign of the product of the volatile quantity and the angular velocity of the model vector.

5. The method recited in claim 1, wherein the angle of rotation is determined from a function of the angular velocity of the model vector, preferably from a function of the angular velocity of the model vector and a state variable.

6. The method recited in claim 1, wherein the magnitude of the correction vector is preset proportionally to the volatile quantity and the derivative of the magnitude of the model vector is used as a volatile quantity.

7. The method recited in claim 6, wherein the correction vector magnitude is preset proportionally to the difference of the volatile quantity and a reference quantity.

8. The method recited in claim 6, wherein the proportionality factor is preset as a function of the angular velocity of the model vector, preferably as a function of the angular velocity and a state variable.

9. The method recited in claim 1, wherein, from measured values fixing the differential of the physical quantity, the input vector is formed according to the smoothed differential of the physical quantity with a predetermined smoothing time constant and wherein, from the integral of the sum vector and said smoothed differential multiplied with the smoothing time constant, the model vector, for the unsmoothed physical quantity is formed.

10. The method recited in claim 1, wherein the integration of the sum vector is performed in a rotating coordinate system and wherein the frequency of the rotating coordinate system is determined so that one of the rotating coordinate axes is slaved to the direction of the model vector and/or a reference vector predetermined by reference quantities.

11. Application of the method recited in any of claims 1 to 10 for determining the model vector for the flux of a rotating field machine by integration of the EMF vector formed by measured values of the current and the voltage where the stator current is impressed by a converter as a function of two control quantities referred to the model vector, which influence components parallel and perpendicular to the field of the stator current ($i_s$) independently, and where preferably the direction difference between the correction vector and the model vector is changed as a function of a state variable characterizing the load state of the rotating field machine.

12. Apparatus for stabilizing the locus of a model vector mapping a vectorial physical quantity and being formed in a computing circuit having at least one integrator by integration of a reference vector:
(a) detector means for determining, from preset individual physical quantities, a reference vector;
(b) correction vector former means for forming a correction vector derived from the model vector; and
(c) integration circuit means for integrating a sum vector comprising the reference vector and the correction vector,
(d) said correction vector former means comprising means for forming a magnitude for presetting a correction vector magnitude which is proportional to a volatile quantity of the model vector, and direction-determining means for presetting a direction of the correction vector rotated relative to the model vector.

13. The apparatus recited in claim 12, wherein the direction-determining means comprise an angle of rotation former which fixes a control vector with a direction which is rotated relative to the direction of the model vector by an angle which is determined by a function of the frequency of the model vector, preferably by a function of this frequency and a state variable; and wherein the magnitude-forming means multiplies the components of the control vector by a function of the volatile quantity, preferably of the volatile quantity itself or of the difference of the volatile quantity and a reference quantity.

14. The apparatus recited in claim 12, wherein the volatile quantity is taken off at an output for the magnitude of the model vector via a differentiating stage or at an input of the integration means.

15. The apparatus recited in claim 12, wherein the detector means comprises means for forming a vector smoothed with a smoothing time constant as the reference vector, and wherein the model vector is taken off at the output of the integration means as the sum of the integrated sum vector and of the reference vector multiplied by the smoothing time constant.

16. The apparatus recited in claim 12 wherein the sum vector is subjected to the integration in a rotating coordinate system and wherein a servo device determines the rotating coordinate system in such a manner that one coordinate axis of the rotating coordinate system falls into the direction of the model vector.

17. The apparatus recited in claim 16, wherein the direction of the coordinate axis is preset by an integrator which is preceded by a controller for the direction deviation of the model vector from the coordinate axis or by a reference quantity for the direction of the coordinate axis.

* * * * *